United States Patent [19]

Sommargren et al.

[11] Patent Number: 4,787,747
[45] Date of Patent: Nov. 29, 1988

[54] STRAIGHTNESS OF TRAVEL INTERFEROMETER

[75] Inventors: Gary E. Sommargren, Santa Cruz, Calif.; Peter S. Young, Middlefield, Conn.

[73] Assignee: Zygo Corporation, Middlefield, Conn.

[21] Appl. No.: 120,371

[22] Filed: Nov. 13, 1987

[51] Int. Cl.⁴ .............................................. G01B 9/02
[52] U.S. Cl. .................................. 356/349; 356/358; 356/363
[58] Field of Search ............... 356/349, 351, 358, 363

[56] References Cited

U.S. PATENT DOCUMENTS

| | | | |
|---|---|---|---|
| 3,790,284 | 2/1974 | Baldwin | 356/349 |
| 4,688,940 | 8/1987 | Sommargren et al. | 356/358 X |
| 4,693,605 | 9/1987 | Sommargren | 356/349 |
| 4,717,250 | 1/1988 | Sommargren | 356/349 |

Primary Examiner—Davis L. Willis
Assistant Examiner—Matthew W. Koren
Attorney, Agent, or Firm—Bryan, Cave, McPheeters & McRoberts

[57] ABSTRACT

An interferometer system capable of measuring accurately the deviations from straightness of travel comprises a source (10) of a frequency stabilized input beam (12) with two linear orthogonally polarized components which may or may not be of the same frequency; a tilted parallel plate or shear plate (16) with regions of reflection, antireflection, and polarizing coatings, for converting the input beam into two separated, parallel, orthogonally polarized beams (30, 31); a half-wave retardation plate (24), located in one of the separated beams (31), for converting the two separated, orthogonally polarized beams into first and second beams which are spatially separated, parallel, and have the same polarization (30, 33); a polarizing beamsplitter (40) and quarter-wave retardation plate (44) for transmitting the first and second beams (34, 35) to a prism assembly (45), attached to the mechanical apparatus whose straightness of travel is to be measured, for refracting the parallel first and second beams (36, 37) into diverging third and fourth beams (38, 39); a mirror assembly (70) with its surfaces (70A, 70B) perpendicular to the third and fourth beams (38, 39) for producing converging fifth and sixth beams (38A, 39A) which are refracted by the prism assembly (45A, 45B) to produce parallel seventh and eighth beams (36A, 37A); the quarter-wave retardation plate (44), the polarizing beamsplitter (40), a split retroreflector (47) for producing parallel ninth and tenth beams which are converted into eleventh and twelfth diverging beams by the prism assembly (45); the mirror assembly (70) producing converging thirteenth and fourteenth beams which are refracted by the prism assembly (45) to produce parallel fifteenth and sixteenth beams which are transmitted by the quarter-wave retardation plate (44) and the polarizing beamsplitter (40); a beam switch (72), for transposing the fifteenth and sixteenth beams (60, 61) so that one (62) passes through the half-wave retardation plate (29) and both (62, 63) pass through the tilted parallel or shear plate (16) where the fifteenth and sixteenth beams (63, 64) are recombined into a single output beam (80) having two orthogonally polarized components in which the phase difference between the two components of the output beam (80) is related to the deviation from straightness of travel; a polarizer (81), for mixing the orthogonal components of the output beam (80); a photoelectric detector (83) for producing an electrical measurement signal (85); and a phase meter/accumulator (90), for indicating the measured phase, the measured phase being related to the deviation from straightness of travel.

43 Claims, 1 Drawing Sheet

STRAIGHTNESS OF TRAVEL INTERFEROMETER

BACKGROUND OF THE INVENTION

1. Field of the Invention

The present invention relates to apparatus for the measurement of straightness of travel. More particularly, the invention relates to optical apparatus which is useful for high accuracy straightness of travel metrology using interferometry.

2. The Prior Art

High accuracy straightness of travel measurements are increasingly important in the machine tool industry to determine the precise geometry of machine slides. Stringent requirements also exist in the semiconductor fabrication industry to determine the geometry of precision X-Y stages. The short straight edge and the optical flat have been two prior art tools used for measuring the geometry of short axes. Also, a straightness of travel interferometer described in R. R. Baldwin, B. E. Grote, and D. A. Harland, "A Laser Interferometer that Measures Straightness of Travel," Hewlett-Packard Journal, Vol. 25, pp. 10-20, January 1974, has been used for the measurement of longer axes.

The prior art straightness of travel interferometer suffers from a number of limitations, in particular: (1) the input and return laser beams are coincident so that it is possible to destabilize the frequency and output power of the laser source, (2) it uses a conventional 50/50 beamsplitter so that it has poor light efficiency; (3) it requires an expensive Wollaston prism, (4) it requires an expensive target mirror assembly whose angle must be matched precisely to the Wollaston prism, and (5) it is very difficult to use since the angular orientation of the target mirror assembly must be maintained very precisely to optical tolerances during the measurements.

In the present invention, (1) the input and return laser beams are offset, (2) it has high light efficiency, (3) no Wollaston prisms are required, (4) it is not necessary to match the angles of the target mirror assembly to another element precisely, and (5) it is easy to use since it does not require critical initial alignment and is insensitive to angular variations during travel. The improvements of the present invention thusly overcome the disadvantages of the prior art and allow the high accuracy, i.e., to a fraction of a micrometer per meter, straightness of travel measurement required for machine tool slides and precision X-Y stages.

SUMMARY OF THE INVENTION

In accordance with the instant invention, we provide an interferometer system capable of measuring accurately the deviations from straightness of travel comprising: (1) a source of a frequency stabilized input beam with two linear orthogonally polarized components which may or may not be of the same frequency; (2) means, most preferably a tilted parallel plate or shear plate with regions of reflection, antireflection, and polarizing coatings, for converting the input beam into two separated, parallel, orthogonally polarized beams; (3) means, most preferably a half-wave retardation plate, located in one of said separated beams, for converting the two separated, orthogonally polarized beams into first and second beams which are spatially separated, parallel, and have the same polarization; (4) means, most preferably a polarizing beamsplitter and quarter-wave retardation plate, for transmitting the first and second beams to; (5) means, most preferably a prism assembly, attached to the mechanical apparatus whose straightness of travel is to be measured, for refracting the parallel first and second beams into diverging third and fourth beams; (6) means, most preferably a mirror assembly with its surfaces perpendicular to the third and fourth beams, for producing, converging fifth and sixth beams which are refracted by the prism assembly to produce parallel seventh and eighth beams; (7) means, most preferably the quarter-wave retardation plate, the polarizing beamsplitter, a split retroreflector for producing parallel ninth and tenth beams which are converted into eleventh and twelfth diverging beams by the prism assembly; (8) means, most preferably the mirror assembly for producing converging thirteenth and fourteenth beams which are refracted by the prism assembly to produce parallel fifteenth and sixteen beam which are transmitted by the quarter-wave retardation plate and the polarizing beamsplitter; (9) means, most preferably a beam switch, for transposing the fifteenth and sixteenth beams so that one passes through the half-wave retardation plate and both pass through the tilted parallel or shear plate where the fifteenth and sixteenth beams are recombined into a single output beam having two orthogonally polarized components in which the phase difference between the two components of the output beam is related to said deviation from straightness of travel; (10) means, most preferably a polarizer, for mixing the orthogonal components of the output beam; (11) means, most preferably a photoelectric detector for producing an electrical measurement signal; and (12) means, most preferably a phase meter/accumulator, for indicating the measured phase, the measured phase being related to the deviation from straightness of travel.

THE DRAWINGS

In the drawings,

FIG. 1 depicts in schematic form the instant invention.

DETAILED DESCRIPTION OF THE INVENTION

Figure 1:
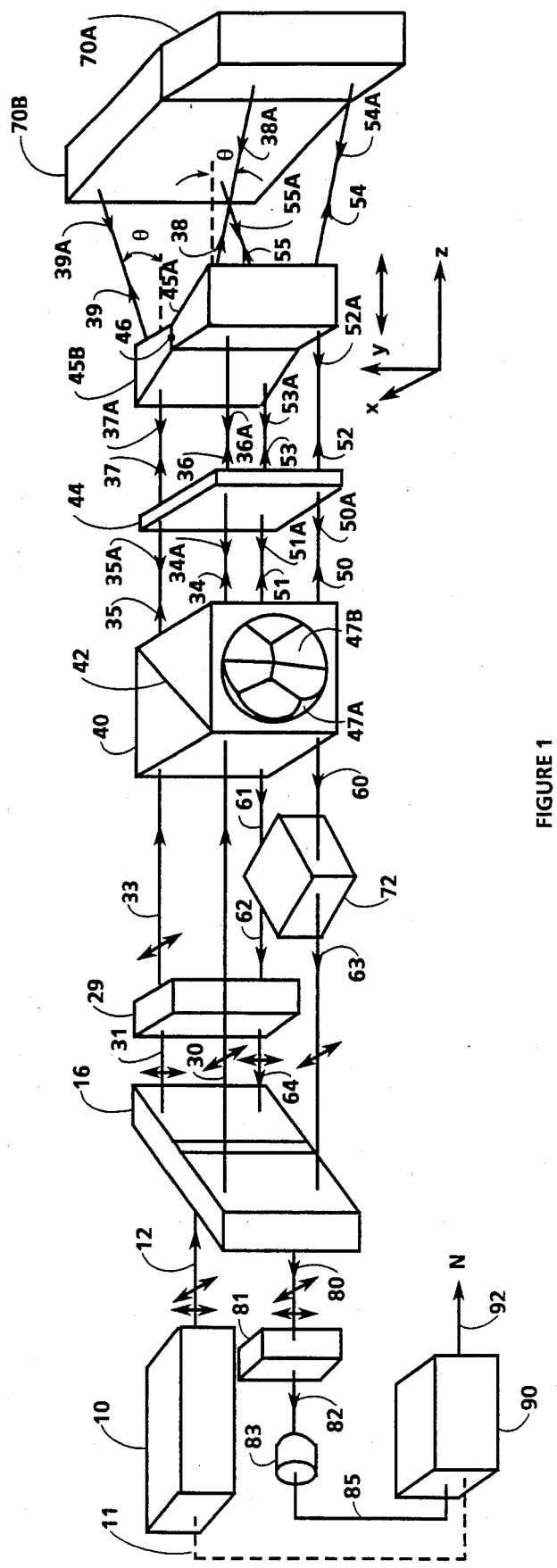

FIG. 1 depicts in schematic form one embodiment of the instant invention. While the apparatus has application for a wide range of radiation sources, the following description is taken by way of example with respect to an optical measuring system. Light source (10), which most preferably uses a laser, emits input beam (12) which is frequency stabilized comprised of two linear orthogonally polarized components as indicated by the two arrows on beam (12), which may or may not be of the same optical frequency. If the frequencies are the same, see for example Downs, et al. U.S. Pat. No. 4,360,271, issued Nov. 23, 1982. If the frequencies are different, see for example, Bagley, et al. U.S. Pat. No. 3,458,259 issued July 26, 1969 and commonly owned U.S. Pat. No. 4,688,940 issued Aug. 25, 1987 in which instant source (10) would provide an electrical reference signal (11), shown by the dotted lines in FIG. 1, which would correspond to the frequency difference between the two stabilized frequencies. No such reference signal (11) is provided when the two orthogonally polarized components, comprising input beam (12) are of the same frequency.

Beam (12) is incident on shear plate (16) which is a tilted glass substrate with optically flat surfaces and which are mutually parallel. The function of tilted parallel plate (16) is to spatially separate the two polarizations components using conventional polarization techniques as described in detail in commonly owned U.S. Pat. No. 4,693,605 issued Sept. 15, 1987. Thus, in the embodiment of FIG. 1, beam (12) is divided by tilted parallel plate (16), with the aid of antireflection coatings, a polarizing coating, and a reflective coating, to become vertically polarized beam (31) and horizontally polarized beam (30). Beam (31) passes through the single half-wave retardation plate (29) which rotates the linear polarization of beam (31) by 90° so that resultant beam (33) has the same polarization as beam (30). Beams (30) and (33) enter polarizing beamsplitter (40) and are transmitted by polarization coating (42) as beams (34) and (35) respectively. Beams (34) and (35) pass through quarter-wave retardation plate (44) and are converted into circularly polarized beams (36) and (37) respectively. Beams (36) and (37) are incident on prism assembly (45). Prism assembly (45) is affixed to the translation stage whose straightness of travel is to be measured. Deviation from straightness of travel is defined as displacements in the x-direction as prism assembly (45) is translated along the z-direction. Prism assembly (45) is comprised of two identical prisms (45A) and (45B) positioned such that their wedge directions point inward toward each other. Beam (36) is refracted by prism (45A) as beam (38). Beam (37) is refracted by prism (45B) as beam (39). Beams (38) and (39) are each deviated from the original paths by angle $\theta$, but in opposite directions. Beams (38) and (39) are incident on stationary mirror assembly (70). Mirror assembly (70) is comprised of two mirrors (70A) and (70B) whose surfaces are nominally perpendicular to beams (38) and (39) respectively. Beams (38) and (39) are reflected from mirrors (70A) and (70B) as beams (38A) and (39A) respectively. Beams (38A) and (39A) are refracted by prisms (45A) and (45B) as beams (36A) and (37A) respectively. Beams (36A) and (37A) pass through quarter-wave retardation plate (44) and are converted into linearly polarized beams (34A) and (35A) that are orthogonally polarized to the original incident beams (34) and (35). Beams (34A) and (35A) are reflected by polarization coating (42) of polarizing beamsplitter (40) to split retroreflector (47). Split retroreflector is comprised of two partial retroreflectors (47A) and (47B) whose apexes are separated horizontally by a distance equal to the separation of beams (34A) and (35A). Beam (34A) is reflected by retroreflector (47A) and polarization coating (42) as beam (50). Beam (35A) is reflected by retroreflector (47B) and polarization coating (42) as beam (51). Beams (50) and (51) pass through quarter-wave retardation plate (44) and are converted into circularly polarized beams (52) and (53) respectively. Beams (52) and (53) are incident on prism assembly (45). Beam (52) is refracted by prism (45A) as beam (54). Beam (53) is refracted by prism (45B) as beam (55). Beams (54) and (55) are each deviated from their original paths by angle $\theta$, but in opposite directions. Beams (54) and (55) are reflected from mirrors (70A) and (70B) as beams (54A) and (55A) respectively. Beams (54A) and (55A) are refracted by prisms (45A) and (45B) as beams (52A) and (53A) respectively. Beams (52A) and (53A) pass through quarter-wave retardation plate (44) and are converted into linearly polarized beams (50A) and (51A) that are polarized the same as the original incident beams (34) and (35). Beams (50A) and (51A) are transmitted by polarization coating (42) of polarizing beamsplitter (40) as beams (60) and (61) respectively. Beams (60) and (61) are incident on beam switch (72). Beam switch (72) transposes beams (60) and (61) by refracting them as beams (62) and (63) respectively. Beam (62) passes through half-wave retardation plate (29) which rotates the linear polarization of beam (62) by 90° so that resultant beam (64) has a linear polarization which is orthogonal to beam (63). Beams (63) and (64) are combined by tilted shear plate (16), with the aid of a polarizing coating, a reflective coating and antireflection coatings, each becoming one linearly polarized component of beam (80). For the initial position of prism assembly (45), each component of beam (80) has transversed exactly the same optical path length (through air and glass). As prism assembly (45) is translated along the z-direction, any transverse displacement of nodal point (46) of prism assembly (45) along the x-direction will introduce an optical path change between the two components of beam (80). This optical path change, OPC, is expressed as $$OPC = 8 X \sin\theta$$

where X is the transverse displacement (deviation from straightness) of prism assembly (45) and $\theta$ is the angular deviation of the beams through prism assembly (45). This optical path change results in a phase difference between the two polarization components of beam (80). This phase difference is measured by passing beam (80) through polarizer (81), oriented at 45° to each polarization component, which mixes the two orthogonally polarized components in beam (80) to give beam (82). The interference between the two polarization components is detected by photodetector (83) producing electrical signal (85). Electronic module or phase meter/accumulator (90) extracts the phase change from electrical signal (85). When the two polarization components of beam (12) are of the same optical frequency, module (90) does not require reference signal (11), since there is no corresponding frequency difference, and conventionally extracts the phase change from signal (85) such as in the manner described in aforementioned U.S. Pat. No. 4,360,271.

However, when the two polarization components of beam (12) are of different frequencies, an additional sinusoidal electrical reference signal (11) equal in frequency to the difference between the two optical frequencies is required by electronic module (90), which reference signal (11), as previously mentioned, would be provided from source (10) in which photodetector (83) would detect the interference between the two frequency components as a sinusoidal intensity variation with a frequency approximately equal to the difference frequency between the two components of beam (12), and module (90) would preferably comprise a phase meter/accumulator such as described in the aforementioned U.S. Pat. No. 4,688,940. In either event, electronic module (90) provides output (92) which is directly proportional to the optical path difference given in the above equation.

The output (92) of module (90) is usually in terms of counts, N, which is related to the optical path change, OPC, by, $$\begin{aligned} N &= (M/\lambda)(OPC) \\ &= (8M/\lambda)(X\sin\theta), \end{aligned}$$

where $\lambda$ is the wavelength of beam (12) and M is an integer which characterizes the degree to which module (90) can sub-divide the wavelength $\lambda$. The deviation from straightness, X, is then given by $$X = \frac{N\lambda}{8M\sin\theta}$$

For nominal values of M, $\lambda$ and $\theta$, the resolution of this straightness of travel interferometer is approximately 0.02 $\mu$m. In addition, this straightness of travel interferometer is insensitive to translation along the z- and y-directions and rotation about the y-axis through module point (46); has return beam (80) offset from incident beam (12) to prevent feedback into the laser thereby preventing laser frequency instabilities; does not require critical fabrication and alignment; and makes efficient use of the optical power in beam (12).

The principal advantages of the instant invention are (1) the input and return laser beams are offset, (2) it has high light efficiency, (3) no Wollaston prisms are required, (4) it is not necessary to match the angles of the target mirror assembly to another element precisely, and (5) it is easy to use since it does not require critical initial alignment and is insensitive to angular variations during travel.

While a preferred embodiment of the invention has been disclosed, obviously modification can be made therein, without departing from the scope of the invention as defined in the following claims.

What is claimed is:

1. An interferometer system capable of measuring accurately a deviation from straightness of travel of a mechanical apparatus, said system comprising a source of a frequency stabilized input beam with two linear orthogonally polarized components; means for converting said input beam into two separated, parallel, orthogonally polarized beams; means located in one of said separated beams, for converting said two separated, orthogonally polarized beams into first and second beams which are spatially separated, parallel, and have the same polarization; means for transmitting said first and second beams; means disposed in the path of said transmitted beams and attached to said mechanical apparatus whose straightness of travel is to be measured for refracting said parallel first and second beams into diverging third and fourth beams; means disposed in the path of said third and fourth beams for producing converging fifth and sixth beams which are refracted by said refracting means to produce parallel seventh and eighth beams; means for producing parallel ninth and tenth beams, said ninth and tenth beams being converted into eleventh and twelfth diverging beams by said refracting means; means for producing converging thirteenth and fourteenth beams which are refracted by said refracting means to produce parallel fifteenth and sixteenth beams which are transmitted by said transmitting means; means for transposing said fifteenth and sixteenth beams for providing a single output beam having two orthogonally polarized components in which a phase difference between the two components of said output beam is related to said deviation from straightness of travel; means for mixing said orthogonal components of said output beam; means for producing an electrical measurement signal; and means for indicating a measured phase, said measured phase being related to said deviation from straightness of travel.

2. A system in accordance with claim 1 wherein said two polarized components from said source are of the same frequency.

3. A system in accordance with claim 1 wherein said two polarized components from said source are of different frequencies.

4. A system in accordance with claim 1 wherein said means for converting said input beam into two orthogonally polarized beams comprises a tilted parallel plate.

5. A system in accordance with claim 1 wherein said means for converting said input beam into two orthogonally polarized beams comprises a shear plate with regions of reflection, antireflection, and polarizing coatings.

6. A system in accordance with claim 1 wherein said means for converting said two orthogonally polarized beams into said first and second beams having the same polarization comprises a half-wave retardation plate.

7. A system in accordance with claim 1 wherein said transmitting means comprises a polarizing beamsplitter and quarter-wave retardation plate.

8. A system in accordance with claim 1 wherein said means for refracting said first and second transmitted beams into said diverging third and fourth beams comprises a prism assembly.

9. A system in accordance with claim 1 wherein said means for producing said converging fifth and sixth beams comprises a mirror assembly having its surfaces normal to said third and fourth beams.

10. A system in accordance with claim 1 wherein said means for producing said ninth and tenth beams comprises a quarter-wave retardation plate, polarizing beamsplitter and a split retroreflector.

11. A system in accordance with claim 10 wherein said means for transmitting said first and second beams further comprises means for producing said ninth and tenth beams.

12. A system in accordance with claim 11 wherein said means for transmitting said first and second beams comprises said polarizing beamsplitter and said quarter-wave retardation plate.

13. A system in accordance with claim 8 wherein said reflecting means further comprises means for converting said ninth and tenth beams into said eleventh and twelfth diverging beams.

14. A system in accordance with claim 9 wherein said mirror assembly further comprises means for producing said converging thirteenth and fourteenth beams.

15. A system in accordance with claim 1 wherein said transposing means comprises a beam switch.

16. A system in accordance with claim 1 wherein said means for mixing said orthogonal components comprises a polarizer.

17. A system in accordance with claim 1 wherein said means for producing an electrical measurement signal comprises a photoelectric detector.

18. A system in accordance with claim 1 wherein said means for indicating a measured phase comprises a phase meter/accumulator.

19. A system in accordance with claim 6 wherein said transmitting means comprises a polarizing beamsplitter and quarter-wave retardation plate.

20. A system in accordance with claim 10 wherein said means for refracting said first and second transmitted beams comprises a prism assembly.

21. A system in accordance with claim 20 wherein said means for producing said converging fifth and sixth beams comprises a mirror assembly having its surfaces normal to said third and fourth beams.

22. A system in accordance with claim 21 wherein said means for producing said ninth and tenth beams comprises said quarter-wave retardation plate, said polarizing beamsplitter and a split retroreflector.

23. A system in accordance with claim 22 wherein said means for transmitting said first and second beams further comprises means for producing said ninth and tenth beams.

24. A system in accordance with claim 23 wherein said means for transmitting said first and second beams comprises said polarizing beamsplitter and said quarter-wave retardation plate.

25. A system in accordance with claim 24 wherein said means attached to said mechanical apparatus comprises said prism assembly.

26. A system in accordance with claim 25 wherein said transposing means comprises a beam switch.

27. A system in accordance with claim 26 wherein said means for mixing said orthogonal components comprises a polarizer.

28. A system in accordance with claim 27 wherein said means for producing an electrical measurement signal comprises a photoelectric detector.

29. A system in accordance with claim 28 wherein said means for indicating a measured phase comprises a phase meter/accumulator.

30. A system in accordance with claim 29 wherein said two polarized components from said source are of the same frequency.

31. A system in accordance with claim 30 wherein said means for converting said input beam into two orthogonally polarized beams comprises a tilted parallel plate.

32. A system in accordance with claim 29 wherein said means for converting said input beam into two orthogonally polarized beams comprises a shear plate with regions of reflection, antireflection, and polarized coatings.

33. A system in accordance with claim 29 wherein said two polarized components from said source are of different frequencies.

34. A system in accordance with claim 33 wherei said means for converting said input beam into two orthogonally polarized beams comprises a tilted parallel plate.

35. A system in accordance with claim 33 wherein said means for converting said input beam into two orthogonally polarized beams comprises a shear plate with regions of reflection, antireflection, and polarizing coatings.

36. A system in accordance with claim 31 wherein said beam switch comprises means for transposing said fifteenth and sixteenth beams so that one passes through said half-wave retardation plate and both pass through said tilted parallel plate where said fifteenth and sixteenth beams are recombined for providing said single output beam.

37. A system in accordance with claim 32 wherein said beam switch comprises means for transposing said fifteenth and sixteenth beams so that one passes through said half-wave retardation plate and both pass through said shear plate where said fifteenth and sixteenth beams are recombined for providing said single output beam.

38. A system in accordance with claim 4 wherein said means for converting said two orthogonally polarized beams into said first and second beams having the same polarization comprises a half-wave retardation plate.

39. A system in accordance with claim 38 wherein said transposing means comprises a beam switch.

40. A system in accordance with claim 39 wherein said beam switch comprises means for transposing said fifteenth and sixteenth beams so that one passes through said half-wave retardation plate and both pass through said tilted parallel plate where said fifteenth and sixteenth beams are recombined for providing said single output beam.

41. A system in accordance with claim 5 wherein said means for converting said two orthogonally polarized beams into said first and second beams having the same polarization comprises a half-wave retardation plate.

42. A system in accordance with claim 41 wherein said transposing means comprises a beam switch.

43. A system in accordance with claim 42 wherein said beam switch comprises means for transposing said fifteenth and sixteenth beams so that one passes through said half-wave retardation plate and both pass through said shear plate where said fifteenth and sixteenth beams are recombined for providing said single output beam.

* * * * *